Oct. 9, 1973   I. IVANIER   3,764,278
WIRE PRODUCTS

Filed March 19, 1969                              2 Sheets-Sheet 1

INVENTOR
Isin IVANIER

Alan Swabey
ATTORNEY

Oct. 9, 1973  I. IVANIER  3,764,278
WIRE PRODUCTS
Filed March 19, 1969  2 Sheets-Sheet 2

INVENTOR
Isin IVANIER

ATTORNEY

United States Patent Office 3,764,278
Patented Oct. 9, 1973

3,764,278
WIRE PRODUCTS
Isin Ivanier, 5509 Westbourne, Montreal, Quebec, Canada
Filed Mar. 19, 1969, Ser. No. 808,594
Claims priority, application Great Britain, Oct. 30, 1968,
51,544/68
Int. Cl. B21c 1/02
U.S. Cl. 29—193                                                    2 Claims

ABSTRACT OF THE DISCLOSURE

A metal wire, nail or screw or the like in which the products include a core of overall circular cross-section with at least three integrally connected spirally located ribs. The ribs have a wide root and a characteristic tip. A special reamer is provided for producing a novel die; the die being used for drawing wire therethrough according to a process to produce the products.

This invention relates to the production of cold drawn screw type wire, and nails or screws made therefrom. In a still further aspect, this invention relates to a novel die used in carrying out the process of the present invention to produce these products; and in a still further aspect, to a device for forming the novel die.

U.S. Pats. 946,631 Ballou (1910) and 2,928,528 Kelday et al. (1960), whose disclosure are incorporated by reference, describe the cold drawing of metal wire. The latter patent discloses the cold drawing of wire through a rotatable die which has a passage of gradually diminishing cross-sectional area throughout a substantial part of its working length. The passage has a general cross-sectional shape which is non-circular over at least a substantial portion of its working length and is helically twisted about its longitudinal axis throughout said portion of non-circular cross-sectional shape, so that a wire drawn by the die has crests and valleys in which the grain flow lines run longitudinally across the valleys in the direction of the longitudinal axis of the wire. The resulting article has desirable characteristics imparted by the cold drawing operation and other advantages as elaborated in the Kelday et al. patent. The surface of the drawn article, that is the wire or nails made from it, is essentially provided with helical flat or concave flutes intervened by lands.

Wire according to the present invention is also cold drawn through a rotatable die. But the die of the invention has special characteristics differing from those of the prior art die as will be explained and understood in terms of the wire produced. The wire, as drawn, has a core of overall circular cross-section and integrally standing out from it, in equally spaced apart relationship, at least three helically extending ribs. Adjacent ribs are intervened by convex surfaces of the core, which on a trans-axial cross-section through the wire, are arcuate. In a preferred construction, each rib tapers from a relatively blunt root to a tip which may be sharp or slightly rounded for example having a radius of not more than about five thousandths of an inch. Preferably, the root of each rib is not less than one third and not greater than equal to the length of the arcuate surface of the core between adjacent ribs. Preferably, the height of each rib is at least as great and not more than twice the width of its root.

The wire may be drawn through a die of special construction which is an aspect of the invention. The die is made using a reamer which is also an aspect of the invention. The reamer has essentially the configuration of the wire described above, except that it is tapered for the purpose of conforming to the tapered opening in the die when the latter is being fashioned. The tips of its ribs are preferably sharp. The reamed die has an opening, tapering to a narrower dimension from the entrance to the exit end and helical grooves complementary to the ribs of the reamer and arcuate surfaces intervening the grooves.

The wire may be drawn by the use of the die, in accordance with another aspect of the invention, as follows. The die is held in a manner well known, permitting it to rotate freely as the wire is drawn through the helically grooved working opening. In the drawing process, the wire immediately comes into contact with the grooved working surface and stays in contact with it until leaving the die. It is a feature of the method of the invention that wire emerging from the grooved die has an outside diameter markedly greater than the outside diameter of the wire as it enters the die. The working surface of the die of the invention is longer than usual for a die for making fluted wire as in the aforesaid Kelday et al. patent.

Having thus generally described the nature of the invention, it will be referred to in greater detail by reference to the accompanying drawings, which illustrate preferred embodiments and in which.

Figure 2:
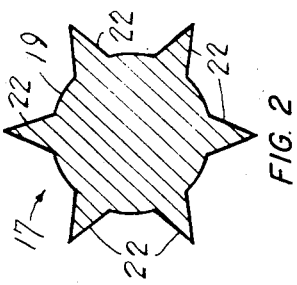
FIG. 2 is an enlarged cross-section on the line 2—2 of FIG. 1.
Figure 5:
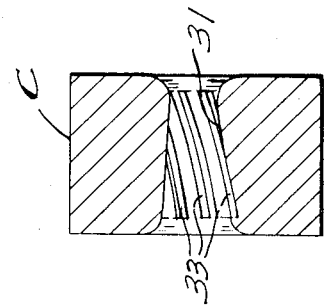
FIG. 5 is a longitudinal cross-section through the die of FIG. 4.
Figure 1:
FIG. 1 is a side elevation of a reamer used to make a die for drawing wire according to the invention.
Figure 4:
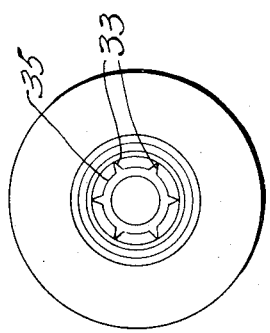
FIG. 4 is an entrance end view of a die according to the invention.

In carrying out the invention, a reamer of a special form is made from tool steel. One form is shown in FIGS. 1 and 2. The fraser shown, by way of example, has six ribs, but it should be understood that the number of ribs can be anywhere from three or more and can go up to fifteen or more, depending on the size of the wire and the gauge of the wire to be cold drawn, as will be explained more fully later. A preferred range is from three to nine ribs.

Referring to FIGS. 1 and 2, the reamer indicated generally as A is provided with a shank 15 and a working part 17. The part 17 has a core of overall circular cross-section and tapers from the junction with the shank 15 to its free end (the arcuate surfaces 19) with integral protruding ribs 22. The ribs 22 and the intervening arcuate (on a section normal to the axis of the body) parts 19 extend helically the length of the working part 17.

Figure 3:
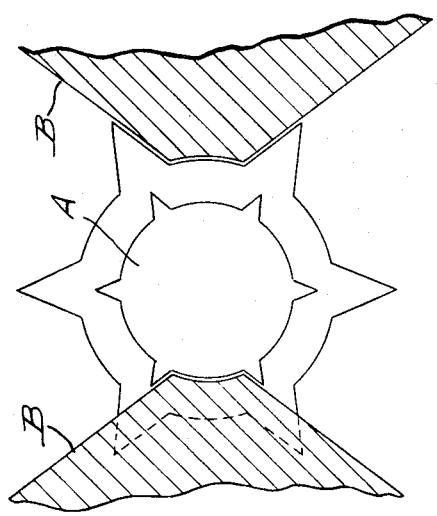
FIG. 3 is an end view illustrating a manner of forming the reamer, showing frasers in contact with a partly formed reamer.

The tool A is formed from a piece of cylindrical tool steel stock. In FIG. 3 on the left-hand side of the drawing, a fraser B is shown in contact with the tip of a partly finished tool and at the right-hand side of the drawing, a fraser B is shown in contact with the wider end of the partially finished tool. FIG. 3 is actually an end view of the fraser looking from the tapered end. The fraser runs up and down the stock and at the same time the stock turns about its axis so that the fraser describes a helical path along the stock and gradually shaves the stock cutting it away along predetermined strips and leaving the ribs 22 intervened by the arcuate surfaces 19. For every diameter of wire and/or number of ribs a different sized fraser will have to be used to appropriately fashion the reamer.

The reamer is used to form the die by pushing the reamer in and out of the die opening of starting circular cross-section tapering from entrance to exit, using a special machine, as is understood by die makers.

The die is shown as C and it has an overall tapering passage 31. In accordance with the invention, there are reamed out grooves 33 intervening ungrooved arcuate surfaces 35. The die is made of "Carboloy" tool steel or other material from which wire drawing dies are made. The difference in the use of the die C, from the use of dies as known, is that the wire that enters the die is not of a greater diameter than the wire that leaves the die, but, on the contrary, the wire entering the die has a smaller diameter and comes out having a larger outside diameter (measured to the tips of the ribs 22). The die C is mounted for free rotation in a unit in which it is held in ball bearings to allow for its free rotation by the drawing action. In the drawing operation, the usual lubricants for cold drawing of metal wires may be employed.

In the drawing operation, the wire is preferably first reduced from a larger diameter to a desired smaller diameter by passing it through a preliminary drawing operation in a normal die having a circular cross-section, and, then immediately passing it through a die grooved according to the invention. The wire entering the grooved die has an outside diameter less than the overall diameter (tip to tip of ribs) of the ribbed wire leaving the grooved die.

Figure 6:
FIG. 6 is a side elevation of helically ribbed wire as cold drawn according to the invention.
Figure 7:
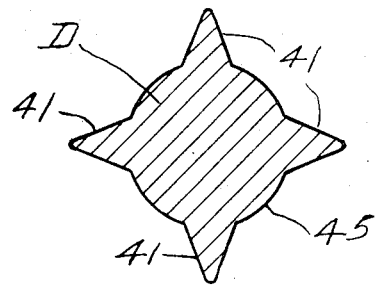
FIG. 7 is an enlarged cross-section through a four ribbed wire according to the invention.

A typical wire resulting from the drawing operation according to the invention is shown in FIGS. 6 and 7. The wire has a core D of circular cross-section and upstanding integral ribs 41 which run helically along the core D, intervened by arcuate surfaces 45 extending helically along and about the core D. The wire can have three or more ribs with three to nine preferred. The limitation in number of ribs is the size of the wire, the larger the wire the more ribs possible. The ends of the ribs can either be sharp, as shown in the drawings, or slightly rounded at the tips (crest) depending on the use to which the resulting products are to be put.

Figure 8:
FIG. 8 is a pair of views (side elevation and head plan view, respectively) showing a screw type nail.
Figure 9:
FIG. 9 is a pair of views similar to those of FIG. 8 showing a screw with a slotted head.
Figure 10:
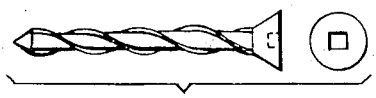
FIG. 10 is a pair of views similar to those of FIGS. 8 and 9 showing a screw having a recessed head.

Screw type nails and screws may be formed from the wire by pointing and heading in a conventional manner. Typical nails and screws are shown in FIGS. 8 to 10. In the case of either the nail or the screw, it can be driven without a screwdriver, simply by hammering. However, in its removal a screwdriver may be used as for a screw or it can be forced out like a nail.

The taper of the reamer and of the working opening in the die may be from 1 degree to 12 degrees from the die axis depending on the diameter of wire to be drawn. According to the invention, the grooves and intervening ungrooved surfaces preferably extend the entire working length of the opening in the tool steel insert of the die, so that the wire entering the die immediately comes into contact with the grooved portion of the die and the wire leaving the die leaves from a grooved portion of the die.

Metals which may be cold drawn according to the invention are any type of metal or alloy normally used for cold drawing, for example steel, aluminum and its alloys, bronze, Phosphor bronze, copper, or brass. Steel is the most common. The direction of the spiral ribs on the nails or the screws can be either righthand or lefthand.

One advantage of the invention is that screws can be made, which can be substituted for those normally made by roll-threading. The nails of the invention have higher strength, for the same diameter, than nails of the fluted type. This means that a larger quantity of the product is available from the same weight of metal. The holding power of the product of the invention is markedly greater than the holding power of a fluted product of the same gauge.

Theoretically, the gauge of the wire which can be drawn is unlimited. The preferred gauges are from 14 gauge up to wires of a diameter of one inch and more. The preferred number of ribs may vary from three to nine, the maximum number of ribs being limited by the diameter of the wire. The width of the rib at the root can be anywhere from one to one third the length of the arc between the roots of respective ribs. As for pitch, this can range from four to .17 turns per inch.

Table I gives a representative range of gauges, namely preferred ranges of external diameters, internal diameters, height of ribs, number of ribs, ranges of pitch, and desirable relationships between these quantitative factors. The linear dimensions are expressed in inches. Taking for example a 5 gauge wire, the external diameter (meaning tip to tip) would be 0.212 inches. The preferred ranges would be: number of ribs 3 to 6; a core diameter of from about 0.106 to about 0.140 inches; height of ribs from about 0.35 to 0.053, and pitch from about .83 to about .4 turns per inch. The height of each rib is measured from its tip or crest to the intersection of a line from the tip or crest perpendicular to the core axis with a line representing an extension of the arcuate surface of the core.

TABLE I.—PREFERRED RANGES

| Gauge | External diameter [1] (in.) | Range of core diameter (in.) | Range for height of ribs (in.) | Number of ribs | Range of pitch (turns/in.) |
| --- | --- | --- | --- | --- | --- |
| 7/0 | .500 | .250–.375 | .062–.125 | 3–9 | .33–.17 |
| 6/0 | .464 | .232–.348 | .058–.116 | 3–9 | .37–.18 |
| 5/0 | .432 | .216–.324 | .054–.108 | 3–9 | .42–.19 |
| 4/0 | .400 | .200–.300 | .050–.100 | 3–9 | .45–.21 |
| 3/0 | .372 | .186–.279 | .046–.093 | 3–9 | .5–.22 |
| 00 | .348 | .174–.261 | .043–.087 | 3–9 | .56–.24 |
| 0 | .324 | .162–.243 | .040–.081 | 3–9 | .59–.26 |
| 1 | .300 | .150–.225 | .037–.075 | 3–9 | .62–.28 |
| 2 | .276 | .138–.207 | .035–.069 | 3–9 | .67–.3 |
| 3 | .252 | .126–.184 | .035–.063 | 3–8 | .71–.33 |
| 4 | .232 | .116–.162 | .035–.058 | 3–7 | .77–.37 |
| 5 | .212 | .106–.140 | .035–.053 | 3–6 | .83–.4 |
| 6 | .192 | .096–.128 | .032–.048 | 3–6 | .9–.44 |
| 7 | .176 | .088–.120 | .030–.044 | 3–6 | 1–.48 |
| 8 | .160 | .080–.108 | .027–.040 | 3–6 | 1.1–.52 |
| 9 | .144 | .072–.096 | .024–.036 | 3–6 | 1.2–.59 |
| 10 | .128 | .064–.084 | .022–.032 | 3–6 | 1.4–.67 |
| 11 | .116 | .058–.072 | .022–.029 | 3–5 | 1.6–.71 |
| 12 | .104 | .052–.067 | .020–.026 | 3–5 | 2–.77 |
| 13 | .092 | .046–.057 | .017–.023 | 3–5 | 2.5–.84 |
| 14 | .080 | .040–.050 | .015–.020 | 3–5 | 3.3–.91 |

[1] As measured tip to tip of ribs.

I claim:

1. A metal wire stock material of indefinite length from which driven fasteners are produced by cold drawing metal wire through a die comprising a die body having a drawing passage of substantially circular cross-section throughout its length and tapering from an inlet to an outlet, at least three equally spaced apart grooves extending spirally about said passage with adjacent grooves intervened by a concave surface of said passage,
   said grooves being of substantially the same cross-sectional shape at said inlet and said outlet and extending the full working length of said die,
   said wire stock material produced by said die having a core of circular cross-section having the same diameter along its length, at least three integral ribs projecting radially from said circular cross-sectioned core along the entire length of said metal wire and extending helically therefrom in equally spaced apart circumferential relationship, each said rib being of constant size and shape throughout the length of the wire and having a wide root tapering to a crest at its edge remote from said root, said ribs and adjacent core portions having the same metallurgic characteristics.

2. A cold drawn wire as defined in claim 1, in which said metal is from the group consisting of steel, aluminum and its alloys, bronze, phosphor bronze, copper and brass.

References Cited

UNITED STATES PATENTS

| | | | |
|---|---|---|---|
| 42,054 | 3/1864 | Watts et al. | 85—20 |
| 108,986 | 11/1870 | Dunn et al. | 85—20 |
| 1,125,885 | 1/1915 | Rouxel | 85—20 |
| 1,194,047 | 8/1916 | Lynch | 85—20 |
| 1,814,966 | 7/1931 | Rosenberg | 85—20 |
| 1,891,895 | 12/1932 | Nagel | 85—20 |
| 2,075,411 | 3/1937 | Vonmertens | 85—20 |
| 2,558,379 | 6/1951 | Phipard, Jr. | 85—20 |
| 3,333,874 | 8/1967 | Gelfarb | 85—20 |
| 946,631 | 7/1908 | Ballou | 29—193 UX |
| 1,394,716 | 10/1921 | Davies | 29—193 UX |
| 1,882,872 | 11/1928 | Palmer | 29—193 |
| 2,957,240 | 10/1960 | Brandes et al. | 29—193 X |
| 3,158,258 | 11/1964 | Kelday et al. | 29—193 X |

FOREIGN PATENTS

| | | | |
|---|---|---|---|
| 273 | 1878 | Great Britain | 85—20 |

ALLEN B. CURTIS, Primary Examiner

O. F. CRUTCHFIELD, Assistant Examiner